United States Patent [19]
Hosking et al.

[11] Patent Number: 5,465,667
[45] Date of Patent: Nov. 14, 1995

[54] MODULAR RAILWAY MAINTENANCE SYSTEM

[75] Inventors: Jack K. Hosking, Waukesha; Gunars Eidemanis, Franklin, both of Wis.

[73] Assignee: Oak Industries, Inc., Waltham, Mass.

[21] Appl. No.: 171,112

[22] Filed: Dec. 21, 1993

Related U.S. Application Data

[63] Continuation-in-part of Ser. No. 103,056, Aug. 6, 1993, Pat. No. 5,398,616.

[51] Int. Cl.$^6$ .................................................. E01B 29/00
[52] U.S. Cl. ...................................... 104/17.2; 104/17.1
[58] Field of Search ............................... 104/17.1, 17.2, 104/2, 7.1, 4, 7.2, 7.3, 9, 12, 16; 180/900; 280/769

[56] References Cited

U.S. PATENT DOCUMENTS

| | | |
|---|---|---|
| 891,700 | 6/1908 | Jacobs . |
| 910,201 | 1/1909 | Jenkins . |
| 953,668 | 3/1910 | Kendrick . |
| 956,856 | 5/1910 | Jacobs . |
| 975,042 | 11/1910 | Jacobs . |
| 1,060,173 | 4/1913 | Edwards . |
| 1,072,618 | 9/1913 | Kendrick . |
| 1,670,007 | 5/1928 | Rasmussen et al. . |
| 1,995,168 | 3/1935 | Bronander . |
| 2,021,170 | 11/1935 | Bronander . |
| 2,591,005 | 4/1952 | Piper ..................................... 104/17.1 |
| 3,064,428 | 11/1962 | Plasser et al. . |
| 3,163,122 | 12/1964 | Johnson . |
| 3,610,158 | 10/1971 | Eidemanis .............................. 104/17.1 |
| 3,628,461 | 12/1971 | Plasser .................................. 104/17.1 |
| 3,690,264 | 9/1972 | Plasser et al. ......................... 104/17.1 |
| 3,753,404 | 8/1973 | Bryan, Jr. . |
| 3,759,334 | 9/1973 | Theurer .................................. 104/17.1 |
| 3,762,333 | 10/1973 | Theurer et al. . |
| 4,131,067 | 12/1978 | Newman et al. . |
| 4,165,694 | 8/1979 | Theurer .................................. 104/7.2 |
| 4,538,793 | 9/1985 | Dieringer et al. . |
| 4,777,885 | 10/1988 | Dieringer . |
| 4,928,600 | 5/1990 | Urmson, Jr. et al. . |
| 5,191,840 | 3/1993 | Cotic et al. . |

Primary Examiner—Mark T. Le
Attorney, Agent, or Firm—Greer, Burns & Crain, Ltd.

[57] ABSTRACT

A modular railway maintenance system for performing at least one of a plurality of right-of-way maintenance tasks on a railroad track includes a base unit including a frame having a plurality of wheels for rotatably engaging the railroad track, a first side corresponding to a first rail of the railroad track, a second side corresponding to a second rail of the railroad track, and at least one of a plurality of task-oriented modules being releasably connectable to the base unit for selective operation of distinct tasks on either side of the base unit.

3 Claims, 12 Drawing Sheets

FIG. 5
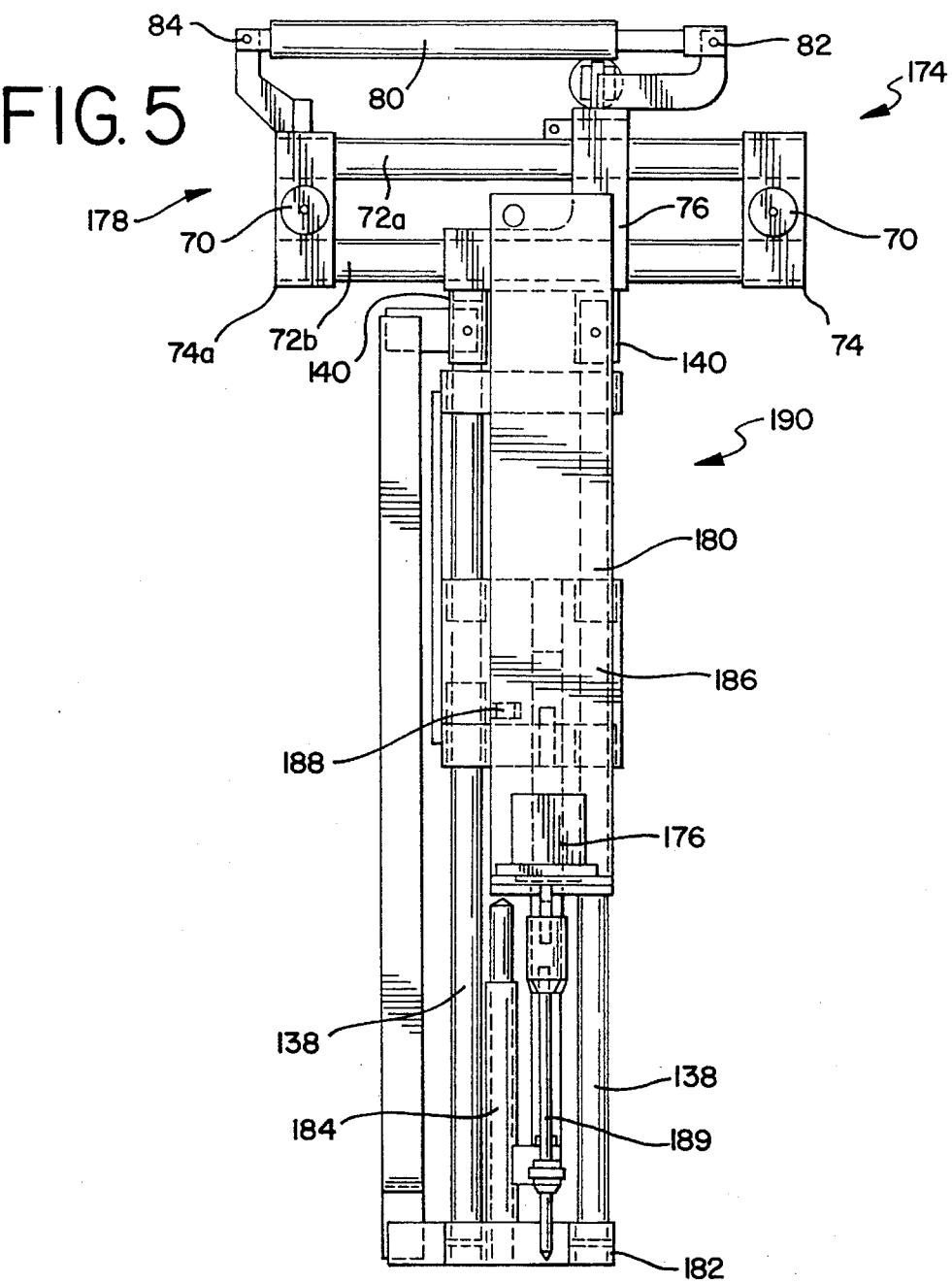
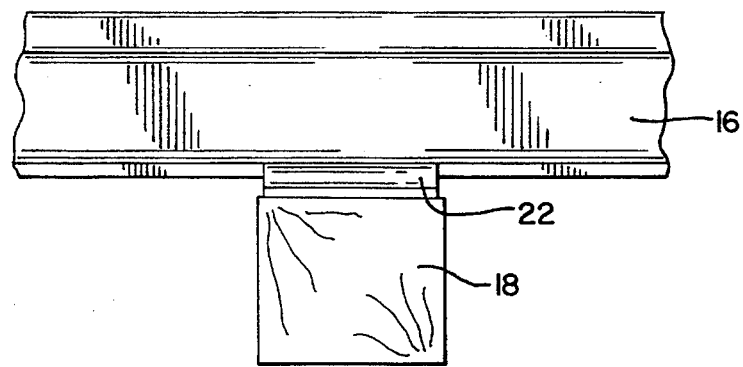

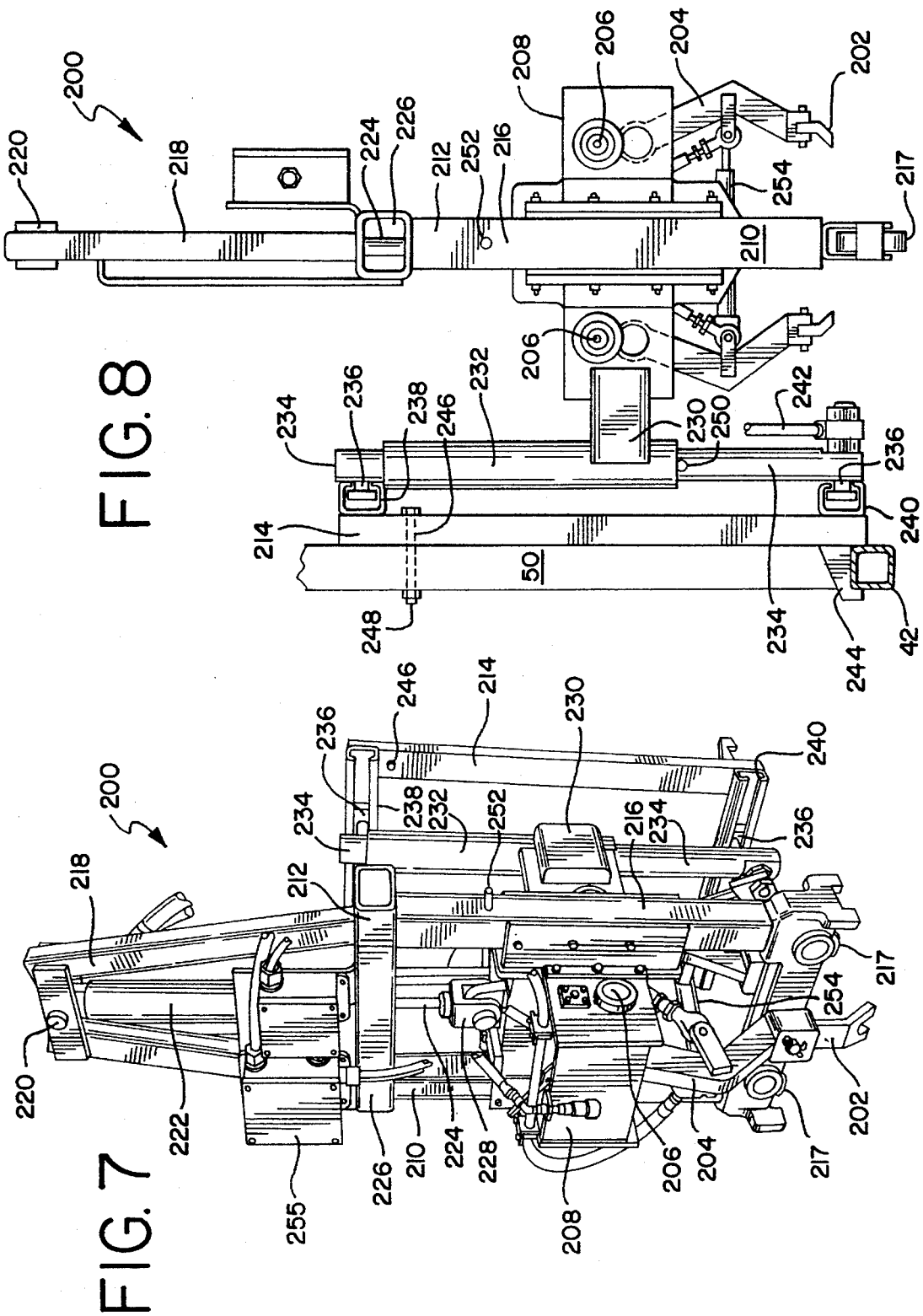

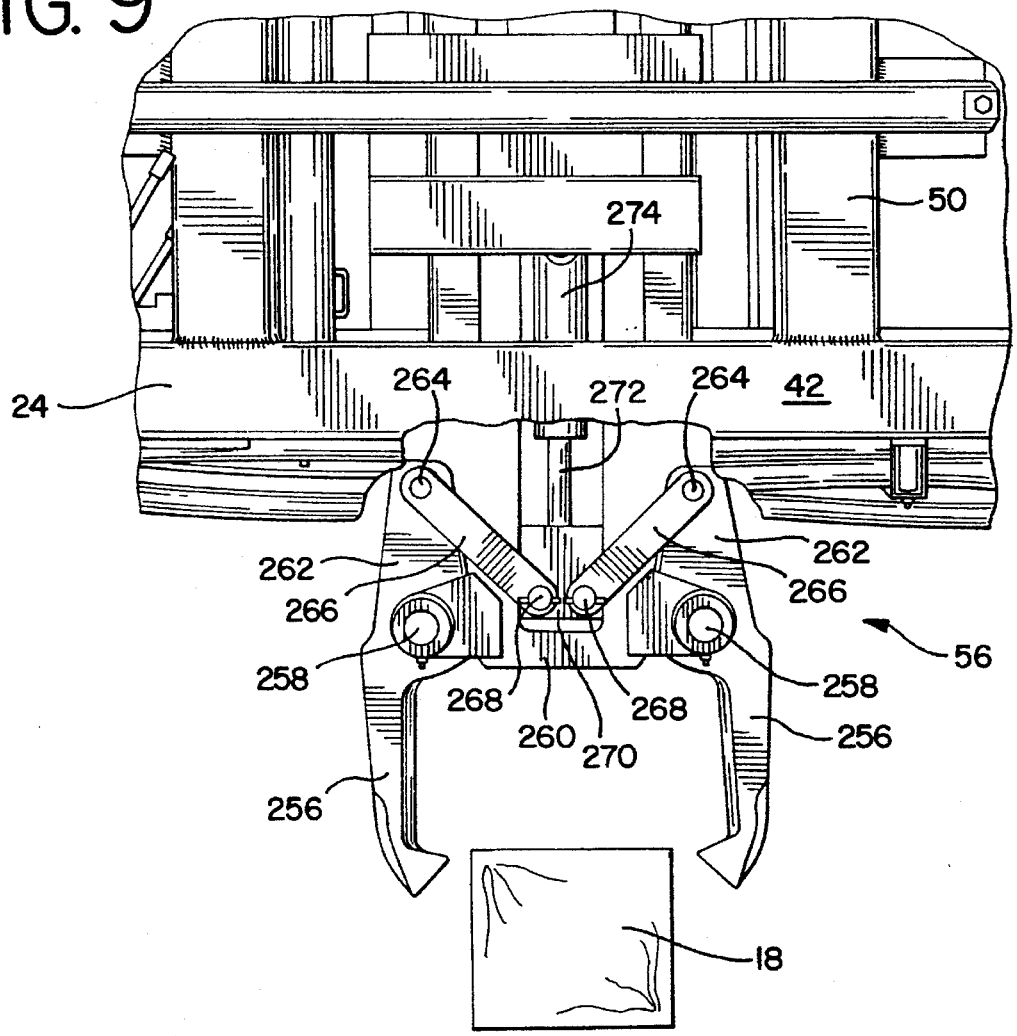

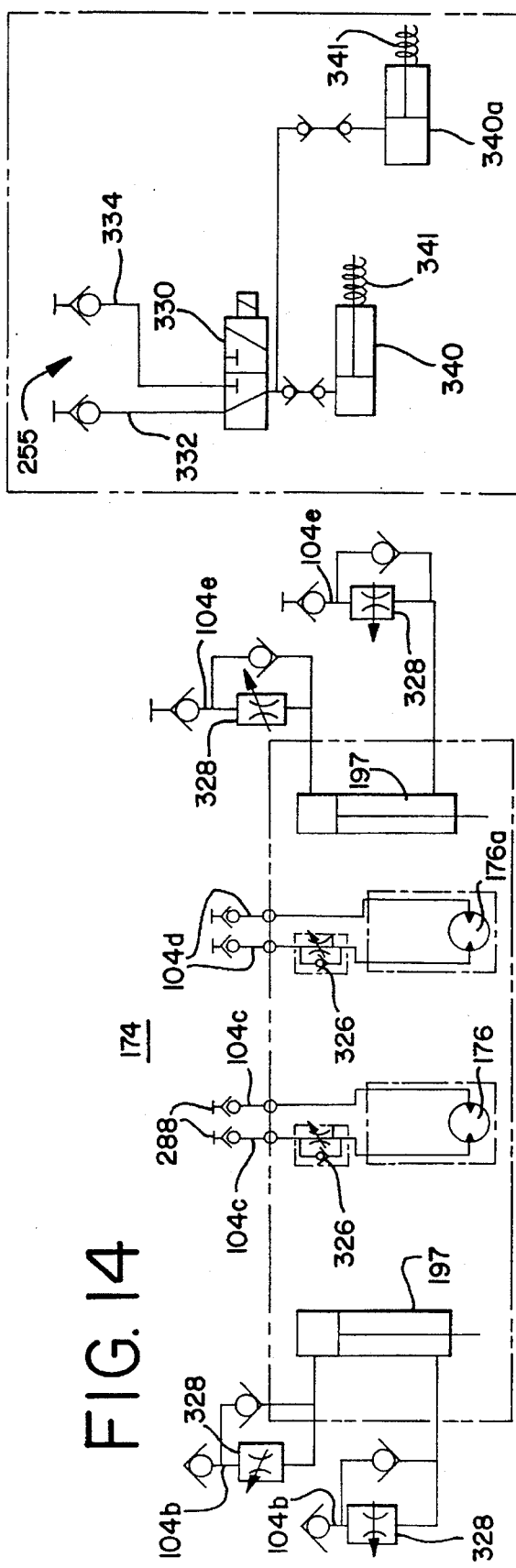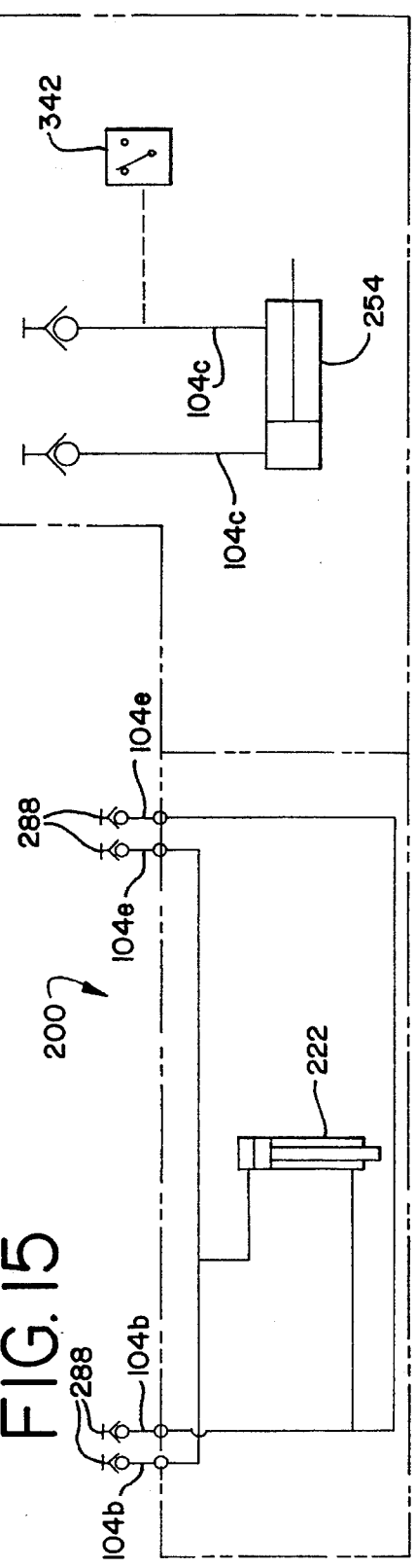

MODULAR RAILWAY MAINTENANCE SYSTEM

RELATED APPLICATION

The present application is a Continuation-In-Part of commonly-assigned, U.S. Ser. No. 08/103,056, filed Aug. 6, 1993 now U.S. Pat. No. 5,398,616 and entitled AUTOMATIC RAIL FASTENER APPLICATOR.

BACKGROUND OF THE INVENTION

The present invention is related to machines used in performing railway right-of-way maintenance, and specifically to a modular system for performing multiple right-of-way maintenance tasks using a common base unit and several interchangeable, task-oriented modules.

Conventional railway right-of-way maintenance operations, such as, but not limited to spike pulling, spike driving, tie boring, tie replacement, lag screw application and anchor removing are performed in gangs of machines, each designed for mechanically performing a specific task under operator control. The machines, which may or may not be self-propelled, are preferably arranged in the gang in task sequence.

A typical railway maintenance machine of the above-identified type includes a self-propelled frame designed for movement along the rail, a work station for at least one operator, operation apparatus for performing the specified task, and control apparatus for controlling the operation apparatus. Thus, regardless of the maintenance task for which a particular machine is designed, there is a certain amount of duplication of components among various right-of-way maintenance machines. Since not all operations are performed during a given maintenance cycle, a railroad maintenance facility will normally not use all of its machinery, and at any given time, one or more machines will be idle. For smaller railroads, or for railway maintenance subcontractors in particular, each machine represents a significant capital expenditure, and which, when idle, naturally cannot generate income.

Also, from a manufacturing standpoint, the manufacture and assembly of a diverse array of machines carries with it inherent problems in efficient assembly. In addition, the purchasing and stocking of original and replacement parts for several distinct yet similar machines may lead to confusion on the part of customers and/or stock personnel.

Consequently, a first object of the invention is to provide a railway maintenance system which maximizes the use of common components, and minimizes duplication.

Another object of the present invention is to provide a railway maintenance system in which several maintenance tasks may be performed by a single machine, simply by removing and replacing task specific modules to accommodate changing needs of the railroad or maintenance contractor.

Yet another object of the present invention is to provide a base railway maintenance unit which can releasably accommodate modules for spike pulling, spike driving, tie boring, and/or lag screw applying.

SUMMARY OF THE INVENTION

Accordingly, the above-identified objects are met or exceeded by the present rail maintenance system, which incorporates the selective use of at least one task-oriented module which may be either fixed or releasably attachable to a base unit. Additional interchangeable modules are available for connection to the base unit as desired. The modules and the base unit are designed so that connections of the required control systems of the various operations are standardized to allow for simplified exchange or replacement of modules.

More specifically, a modular railway maintenance system for performing at least one of a plurality of right-of-way maintenance tasks on a railroad track includes a base unit including a frame having a plurality of wheels for rotatably engaging the railroad track, a first side corresponding to a first rail of the railroad track, and a second side corresponding to a second rail of the railroad track. At least one of a plurality of task-oriented modules is releasably connectable to the base unit. As a preferred option, a connection assembly may be provided for releasably connecting at least one of the modules to at least one of the first and second sides, and a control system may be provided for controlling the operation of each module.

In another embodiment, a task-oriented module is disclosed for use in a modular railway maintenance system for performing at least one of a plurality of right-of-way maintenance tasks on a railroad track, the system including a base unit provided with a frame having a plurality of wheels for rotatably engaging the railroad track, a first side corresponding to a first rail of the railroad track, a second side corresponding to a second rail of the railroad track, and a drive unit for driving the frame along the track. The module includes at least one operational portion for performing at least one of a plurality of specified railway maintenance tasks, and a connection apparatus for releasably connecting the operational portion to the frame of the base unit. If desired, the module may also include a carriage portion for manipulating the position of the at least one operational portion.

In yet another embodiment, a modular railway maintenance system is provided for performing at least one of a plurality of right-of-way maintenance tasks on a railroad track, and includes a base unit having a frame with a plurality of wheels for rotatably engaging the railroad track, a first side corresponding to a first rail of the railroad track, and a second side corresponding to a second rail of the railroad track. The system further includes a first task-oriented module secured to the base unit on the first side and a second task-oriented module secured to the second side, the first module being configured for performing a maintenance task which is distinct from the task performed by the second module.

A significant feature of the present system is that a railroad or railway maintenance contractor may purchase only one base unit and several modules, and still be able to perform multiple tasks. In situations where gang operations are called for, multiple base units may be required, however the number of base units may still be less than the number of possible modules. Another feature of the present system is that manufacturing is simplified, in that a single base unit can be assembled into one of a variety of task oriented machines, eliminating unnecessary disparity in the assembly of shared components.

Yet another feature of the present invention is that, depending on the selection of modules connected to the base unit, different maintenance operations may be performed on either side of the base unit, each such side normally associated with a corresponding one of the rails of the railroad track.

Still another feature of the present system is that maintenance may be more easily performed on the modules or on the base unit due to the relatively simple procedure of disassembly of the modules from the base unit.

BRIEF DESCRIPTION OF THE DRAWINGS

FIG. 5 is an elevational view of a tie borer module suitable for use with the present machine as seen from a side of the machine of FIG. 1;

FIG. 7 is a front perspective elevational view of the spike puller module suitable for use with the base unit of FIG. 1;

FIG. 8 is a side elevational view of the spike puller module shown in FIG. 7 with portions omitted for clarity;

FIG. 9 is a front elevational view of a tie nipper assembly mounted on the base unit of FIG. 1;

FIG. 14 is a hydraulic schematic of the control circuit for the tie borer module; and FIG. 15 is a hydraulic schematic of the control circuit for the spike puller module including the hairpin spike pulling feature.

DESCRIPTION OF THE PREFERRED EMBODIMENT

Figure 1:
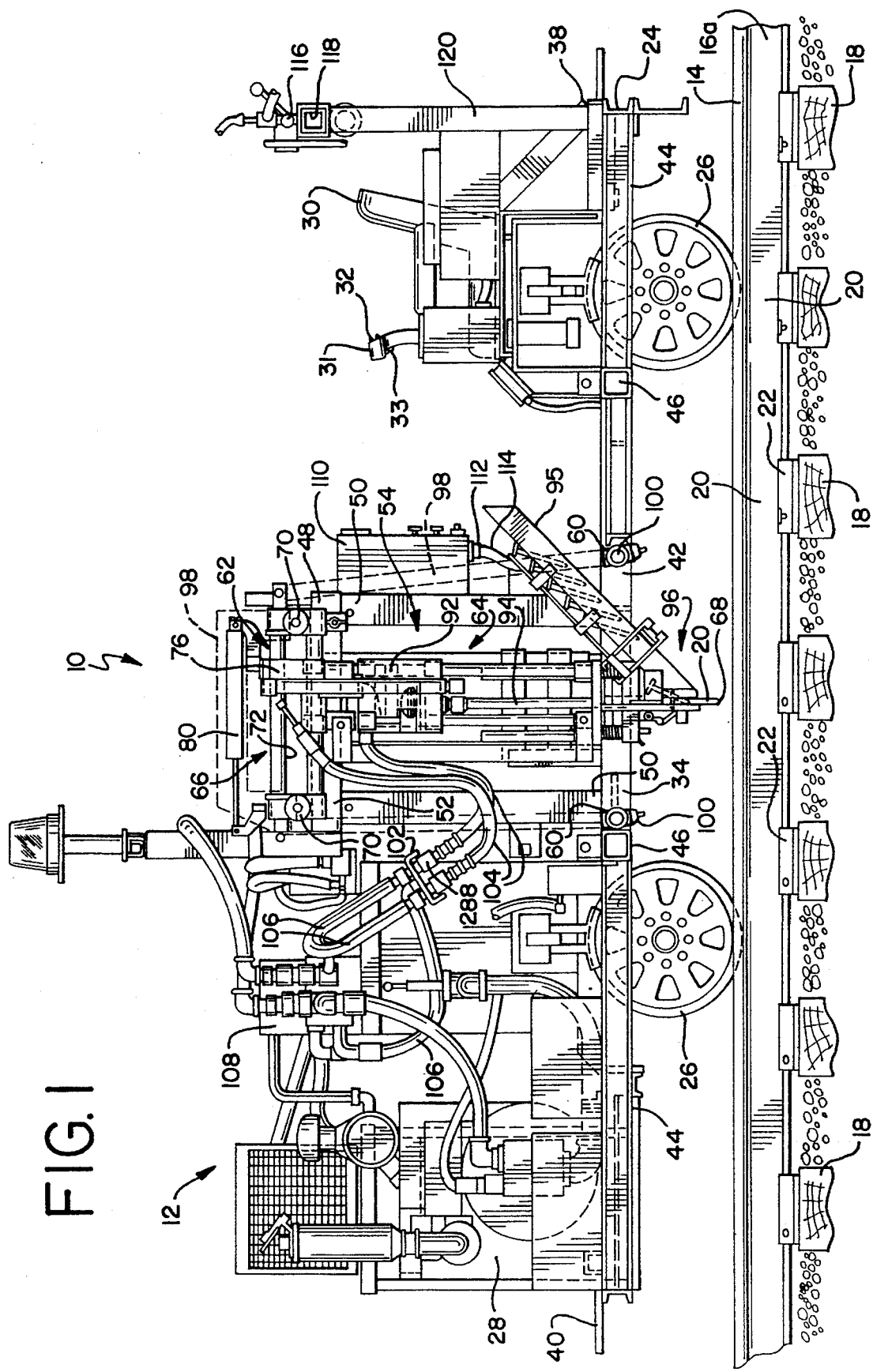
FIG. 1 is a side elevational view of the present base unit with a spike driving module attached thereto.
Figure 2:
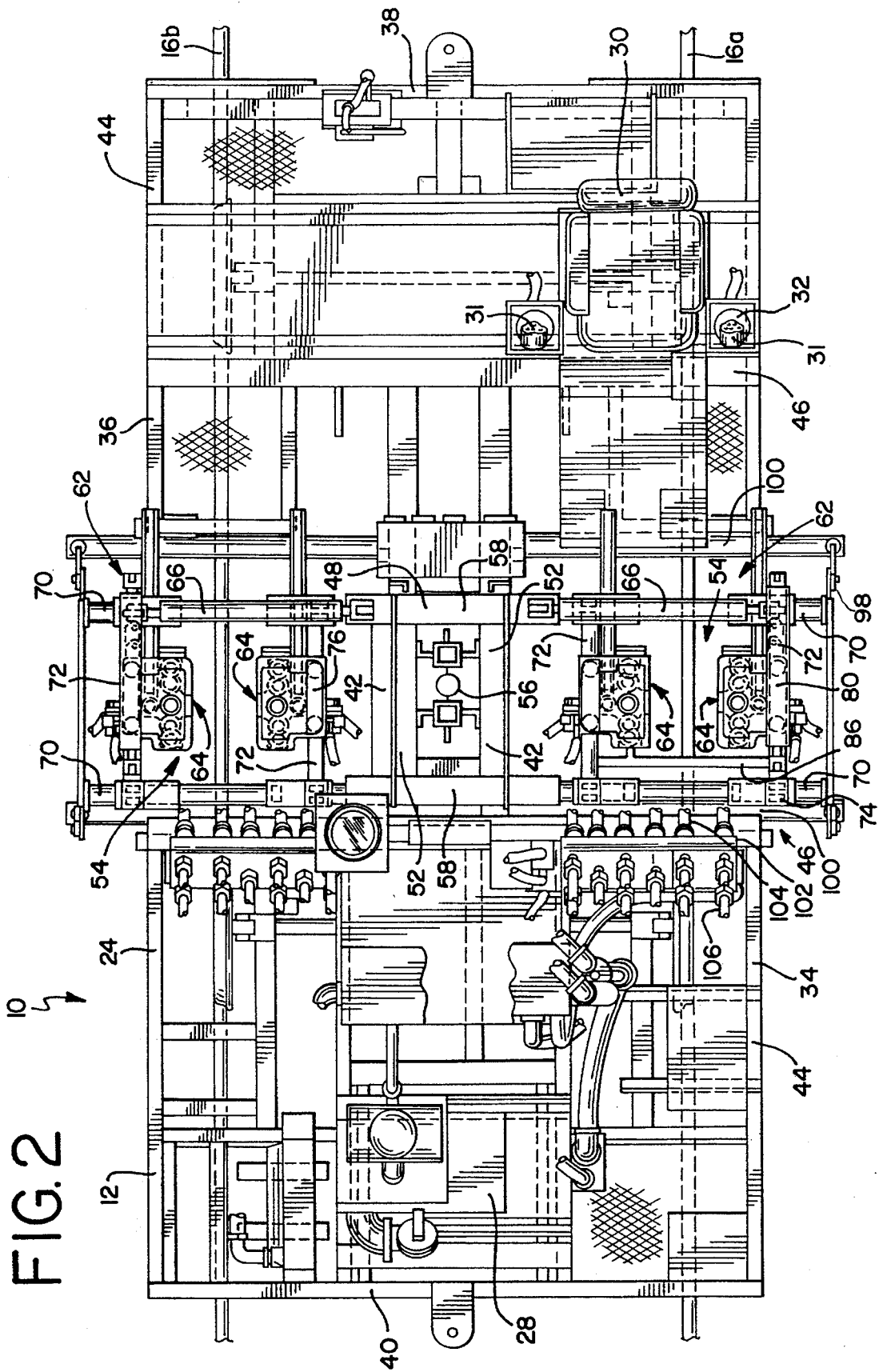
FIG. 2 is a plan elevational view of the frame of the base unit illustrated in FIG. 1.

Referring now to FIGS. 1 and 2, the present modular maintenance system is generally indicated at 10 and includes a base unit generally designated 12, which is preferably designed to be self-propelled on the railroad track 14. It is contemplated however, that the base unit may be configured to be propelled along the track by another vehicle.

The track 14 includes rails 16, designated first and second rails 16a, and 16b, respectively, and a plurality of ties 18 to which the rails are connected. Rails 16a, 16b may be connected to the ties 18 by spikes 20, which pass through tie plates 22, by clips (not shown), or by other fastening devices known in the art. Either the common cut spike (illustrated) or hairpin spikes (not shown) may be used. The base unit 12 includes a frame 24 supported on a plurality of wheels 26 such that the frame can be driven along the rails 16a, 16b. The frame 24 supports a source of motive power 28 such as an internal combustion engine, which propels the unit 12 and also powers the fluid power system, which in the preferred embodiment is hydraulic, and at least one operator's seat 30. At least one of the operator's seats 30 is provided with a control joystick 31 having at least one button 32, a trigger 33 or other functional controls. In the preferred embodiment, the operator's seat 30 is provided with two joysticks 31, one for each side of the base unit 12.

Referring now to FIGS. 1 and 2, it will be evident that the frame 24 has a first side 34 and a second side 36, each side corresponding to one of the rails 16a, 16b. It will be understood that, during operation, one of the rails 16a, 16b may not be present. However, the respective side 34, 36 of the frame 24 will be considered to correspond to the position of the respective rail, whether or not the rail is present. In addition, the frame 24 has a first end 38 and a second end 40. The seat 30 is movable between the first side 34 and the second side 36 to enable the operator to perform maintenance operations on either rail 16a, 16b.

Also included on the frame 24 are a pair of generally parallel main tubes 42. The main tubes are positioned to be approximately parallel to the rails 16a, 16b and are fixed at each end to generally rectangular portions 44 each including a transversely positioned cross tube 46.

A centrally located, elevated portion 48 of the frame 24 is supported by generally vertical columns 50 which are joined at their respective upper ends by horizontal beams 52 to define a generally box-shaped operational zone 54. The operational zone 54 is the area on each respective side 34, 36 of the frame 24 within which one of a plurality of task-oriented modules is releasably connected for performing a specific maintenance operation. At a lower end of the frame 24 below the operational zone 54 is mounted a fluid powered tie nipper assembly 56 (best seen in FIG. 9). The nipper assembly 56 grasps the tie 18 into which the spike 20 is being driven and holds it up against the tie plate and the rail for positive spike driving.

At the top of the elevated portion 48 are located a pair of carriage support tubes 58 which are located in spaced parallel and generally coplanar relationship to each other, and are transverse to the rails 16a, 16b. The tubes 58 serve as upper connection points for some of the task-oriented maintenance modules. In the preferred embodiment, a pair of lower module attachment tubes 60 are attached to the cross tubes 46.

In the embodiment of FIGS. 1 and 2, the base unit 12 is depicted as equipped with a spike driving module 62 on both sides 34, 36. The detailed structure and operation of the preferred type of spike driving module 62 is described in commonly-assigned U.S. Pat. No. 5,191,840, which is incorporated by reference. Basically the spike driving module 62 includes at least one, and preferably two spike driving units 64 which are commonly referred to as spiker guns. For purposes of clarity, only one such gun 64 is depicted in FIG. 1. Further, as other such modules are discussed in relation to the present system, each such independent operating component of a module will be generally referred to as a "gun". The guns 64 may be configured for either an exclusively pushing function, or a pushing function in combination with an on-demand percussive function, as disclosed in U.S. Pat. No. 5,191,840.

Each gun 64 is suspended from the elevated portion 48 of the frame 24 in a known manner by a carriage portion including a so-called "spotting" carriage 66. The carriage 66 enables the gun 64 to be adjustably positioned with respect to the frame 24, both linearly and transversely for proper alignment of a gripped spike 68 into a selected hole in the tie plate 22. Normally, tie plates 22 have several such holes into which spikes are inserted for securing the rails 18 to the ties 14.

References to the spotting carriage 66 apply equally to the embodiments of FIGS. 1–6, wherein like reference characters designate identical features. More specifically, and referring to FIGS. 3 and 4, included on the spotting carriage 66 are a pair of spaced, parallel main carriage shafts 70, which are oriented transversely to the rails 16a, 16b and parallel to the ties 18. Also included on the spotting carriage are at least a pair of spaced, parallel carriage cross shafts 72, which are secured at right angles to the main carriage shafts 70 to form a parallelogram. In the preferred embodiment, upper and lower cross shafts 72a, 72b are provided to enhance stability of the guns 64. The respective shafts 70, 72 are secured to each other by carriage blocks 74.

Movement of each gun 64 parallel to the rails 16 on the spotting carriage 66 is enabled by a slide block 76 located at the upper end of the gun 64. Each slide block 76 includes a transverse throughbore 78 which slidably engages a respective one of the cross shafts 72. A double-acting fluid power cylinder 80, preferably a hydraulic cylinder, is connected to the top of the slide block 76 at 82, and to the carriage block 74a at 84 for controlling the position of the gun 64 relative to the carriage shafts 72. Although only one of the guns 64 is connected to the cylinder 80, the other gun is also slidably engaged on the corresponding carriage cross shaft 72 by slide block 76, and the two slide blocks 76 are designed to move in unison relative to each other by virtue of an adjustable tie bar assembly 86 (best seen in FIG. 2) which also adjustably determines the relative positions of the two guns 64 of each device 10 on the shafts 72 relative to the longitudinal axis of the rails 16.

Movement of the guns 64 in the direction transverse to the rails 16 is determined by the sliding action of the carriage blocks 74, 74a and the carriage cross shafts 72 on the main carriage shafts 70 relative to an inner frame mounting lug 88. The lug 88 is fixed to a corresponding one of the carriage support tubes 58. A second double-acting fluid power cylinder 90 is connected to an upper end of the slide block 74a and to the frame mounting lug 88 to control the sliding action of the slide block 76, the carriage cross shafts 72 and the guns 64 transversely relative to the rails 16. A second adjustable tie bar assembly (not shown) adjustably determines the relative positioning of the guns 64 to each other in the direction transverse to the rails 16.

Returning now to FIG. 1, in its lower or task oriented portion of the module 62, each spike driver gun 64 is provided with a vertically reciprocating hydraulic ram portion 92 with an anvil 94 for driving the spikes, and an angled spike tray assembly 95 for feeding spikes one at a time to a gripping portion 96 adapted for gripping a spike so that it can be properly aligned over a desired hole in the tie plate 22 and accurately driven into the tie 18 at that point. Additional support is provided to the preferred version of the module 62 by an articulated, generally inverted "U"-shaped support bracket 98 (shown in phantom, also seen in FIG. 2). The bracket 98 connects at an upper end to the main carriage shafts 70, and at a lower end to a pair of specialized mounting tubes 100, one of each being mounted to a corresponding rectangular portion 44 of the frame 24.

The spike driver module 62, as well as the other modules designed for use with the base unit 12 each have at least one hydraulic connector and an electronic connector for connecting the module to the control functions of the base unit. In FIG. 1, the hydraulic connector is indicated by the connector plate 102 at which hydraulic lines 104 from the module 62 are releasably connected to corresponding hydraulic lines 106 which lead to a bank or manifold of hydraulic control valves 108. The connector plate 102 is preferably provided with a plurality of quick connect/disconnect fittings for facilitating the exchange of modules.

An electrical control cabinet 110 is located on the base unit 12 in operational proximity of the operator seat 30 to be within easy reach of the operator. At its lower end the control cabinet 110 includes at least one multi-pin cable connector point 112. An electrical cable 114 connects the electrical functions of the module 62 to the control cabinet 110, and is readily removable when modules are exchanged.

An important feature of the present system 10 is that the spike driver module 62, as well as the other modules described below, are designed to be readily detached from the base unit 12. Aside from the disconnectable hydraulic and electrical lines 104, 114, respectively, the structural portion of the modules are also designed for detachability. In that the operational portion of the spike driving module 62, which includes the ram portion 92, the tray assembly 95 and the gripping portion 96, is suspended from the spotting carriage 66, the module may be slidably removed from the base unit by removing the carriage main shafts 70 from the corresponding carriage support tubes 58. The carriage 66 is retained in the tubes 58 only by removable locking pins or bolts 115 (best seen in FIG. 4). Further, the U-shaped support bracket 98 may also be slidably removed from the mounting tubes 100 and the main carriage tubes 70.

Referring again to FIG. 1, the base unit 12 may also be equipped with a winch 116 mounted to a generally horizontal slide bar 118 which is mounted at the first or rear end 38 of the base unit 12. The slide bar 118 is preferably fastened to a pair of vertical supports 120 which in turn are secured to the frame 24. The position of the winch 116 on the slide bar 118 is preferably adjustable.

Figure 3:
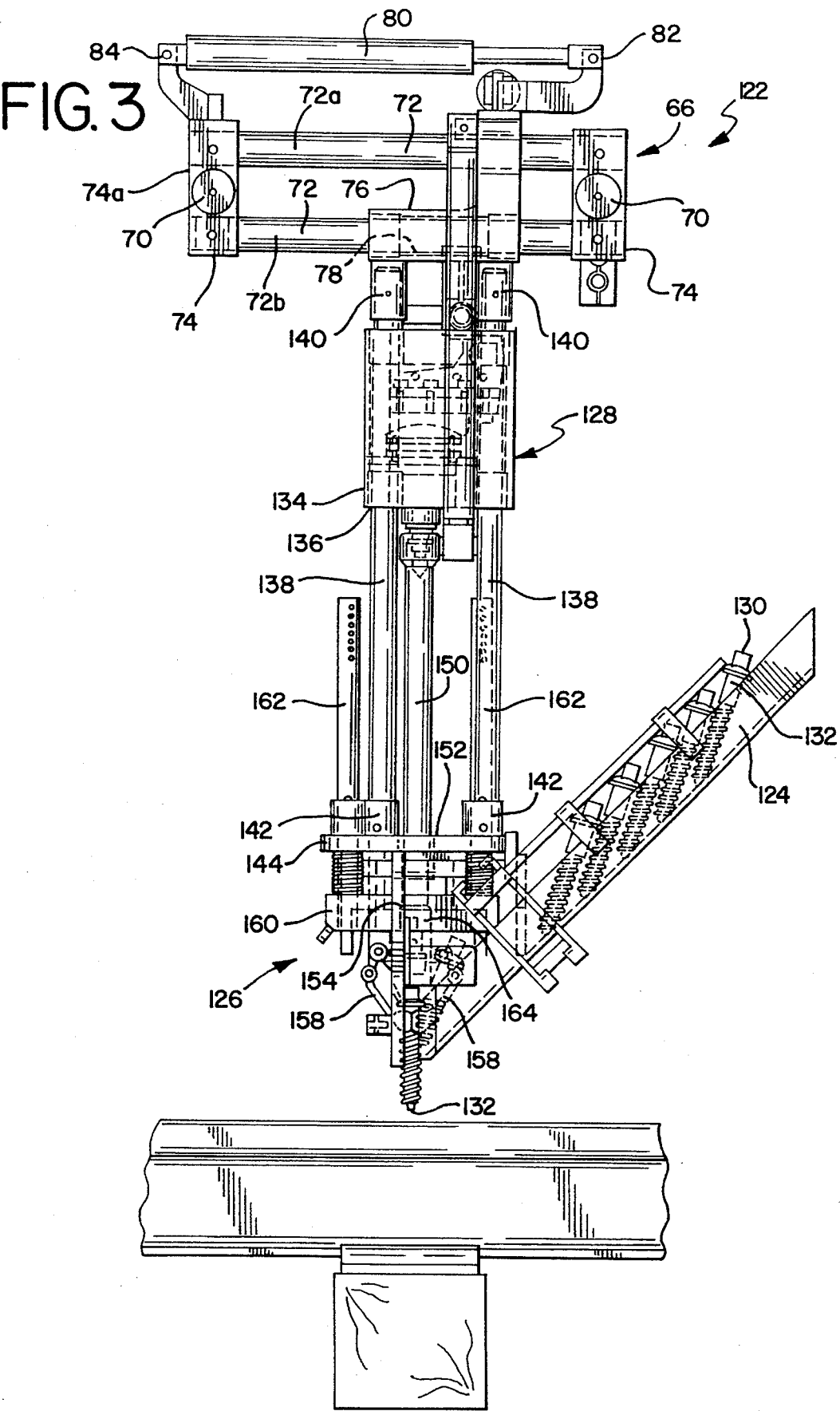
FIG. 3 is an elevational view of a the rail fastener applicator module suitable for use with the base unit of FIG. 1.
Figure 4:
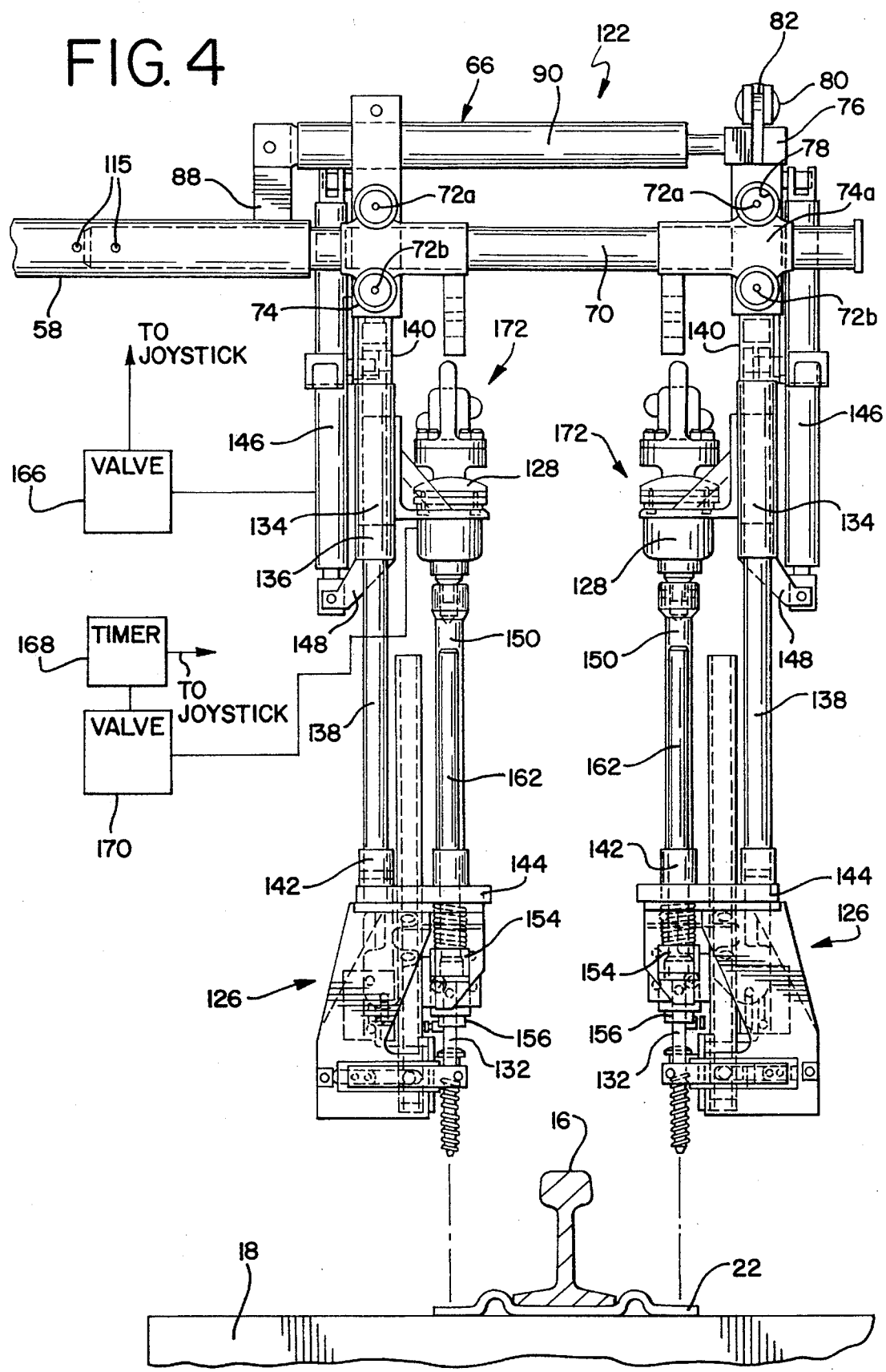
FIG. 4 is an elevational view of the rail fastener applicator device of FIG. 3 as seen from the rear of the machine of FIG. 1, with portions deleted for clarity.

Referring now to FIGS. 3 and 4, the spike driver module 62 may be replaced by a rail fastener applicator module, generally designated 122, and also referred to as a lag screw applicator module. In the preferred embodiment, the module 122 is configured for applying rail lag screws, however the module is contemplated as being suitable for use with other rail fasteners, including threaded nuts. Components of the rail fastener module which are identical to the spike driver module 62 have been designated with identical reference numerals.

The spotting carriage 66 is identical in both the modules 62 and 122, and the module 122 includes a fastener feed tray assembly 124 and a gripping portion 126 which are substantially similar to corresponding systems on the module 62. A major difference between the two modules is that in the fastener module 122, the ram portion 92 is replaced with a vertically reciprocating impact wrench 128, which upon impact with the polygonal head 130 of a rail fastener 132, will axially turn the fastener into a predrilled hole in the tie.

More specifically, an impact wrench mounting bracket 134 has a pair of vertically extending sleeves 136, each dimensioned to slidingly engage a corresponding vertical carriage shaft 138. The carriage shafts 138 are disposed in spaced, parallel relationship to each other and depend at upper ends from sockets 140 integral with the slide block 76. Lower ends of the shafts 138 are inserted into sockets 142 in a feeder frame 144. A fluid power cylinder, preferably a double-acting hydraulic cylinder 146 (best seen in FIG. 4) is used to reciprocally move the impact wrench mounting bracket 134 vertically relative to the vertical carriage shafts 138. The cylinder 146 is connected between the slide block 76 and a tab 148 located on the impact wrench mounting bracket 134. Extension and retraction of the cylinder 146 under the direction of the joystick 31 controls the movement of the impact wrench 128 between an upper, retracted position and a lower, operational position.

In the preferred embodiment, the wrench 128 is a reversible, hydraulically-powered wrench of the type manufactured by the Stanley Works, New Britain, Conn., under Model No. IW-16, however other suitably equivalent impact wrenches, as well as hydraulic motors or electric motors are contemplated. The impact wrench 128 has an elongate, depending extension 150 is mounted to the bracket 134 and transmits the reversible rotational driving force for the application or withdrawal of fasteners 132.

The extension 150 passes through an opening 152 which is centrally located in the feeder frame 144. The extension 150 also includes a lower end 154 provided with a radially enlarged portion which is configured to facilitate locating the enlarged lower end relative to an attachment to the feeder frame for more accurate engagement of fasteners 132. The lower end 154 also includes a socket 156 dimensioned to engage heads 130 of fasteners 132.

Referring again to FIGS. 3 and 4, the gripping portion 126 the lag screw applicator module 122 has at its upper end the feeder frame 144. In function, the gripping portion 126 includes a pair of spring-biased, opposing jaws 158 which receive lag screws 132 one at a time and orient them for proper application into the ties 18. The jaws 158 are mounted to a jaw mounting 160 which is reciprocally movable relative to the feeder frame 144 by means of a pair of guide rods 162. The jaw mounting 160 also defines a central opening 164 through which the extension 150 passes to separate the jaws 158 and push the lag screw 132 into the tie 18. In dimension, the drive socket 156 has a larger diameter than the central opening 164. Thus, retraction of the extension 150 will also retract the jaw mounting 160 and the guide rods 162.

An important feature of the present lag screw applicator module 122 is that the extension 150 is permitted a specified amount of radial deflection relative to the feeder frame 144 as well as to the impact wrench mounting bracket 134. When driving lag screws, once the socket 156 is engaged upon the head 130 of the lag screw 132, radial play of the extension 150 assists in the placement of the fastener into the hole in the tie 18.

Referring now to FIG. 4, the control mechanism for operating the impact wrench 128 includes a first solenoid operated hydraulic valve 166 for controlling the flow of hydraulic fluid to the cylinder 146. The valve 166 is schematically shown, and is contemplated as being a four-way, three-position valve or equivalent. The valve 166 is operated by the operator through the joystick 31. An electric timer 168 is connected to the joystick 31 and to a second solenoid operated hydraulic valve 170 which controls the flow of hydraulic fluid to the impact wrench 128, causing the rotation of the extension 150. Thus, upon activation of the valve 166, there is generated a simultaneous electronic signal to the timer 168, which delays the actuation of the valve 170 for a specified period of time. Although only one lag screw applicator gun control system is depicted in FIG. 4, it will be understood that each lag screw applicator gun 172 has a similar control system. As is the case with the module 62, each rail fastener applicator module 122 is preferably equipped with a pair of fastener applicator guns 172.

The remainder of the hydraulic circuitry for operating the spotting carriage 64 and the machine 12 is well known to skilled practitioners, and an example of such is depicted in commonly assigned U.S. Pat. No. 5,191,840. Further, additional details of the structure and operation of the lag screw applicator module 122 are disclosed in commonly assigned, co-pending U.S. patent application Ser. No. 08/103,056 filed Aug. 6, 1993, which is incorporated by reference.

As was the case with the spike driver module 62, the rail fastener applicator module 122 is readily removable from the base unit 12, and the removal is accomplished through most of the same components as the module 62. Hydraulic lines are detachably connected to the connector plate 102, and the corresponding electrical cable 114 is detached from the control cabinet 110. The spotting carriage 66 on the module 122 is detached from the base unit 12 by withdrawal of the main shafts 70 from the tubes 58. However, the module 122 does not require the inverted "U"-shaped support bracket 98.

Figure 6:
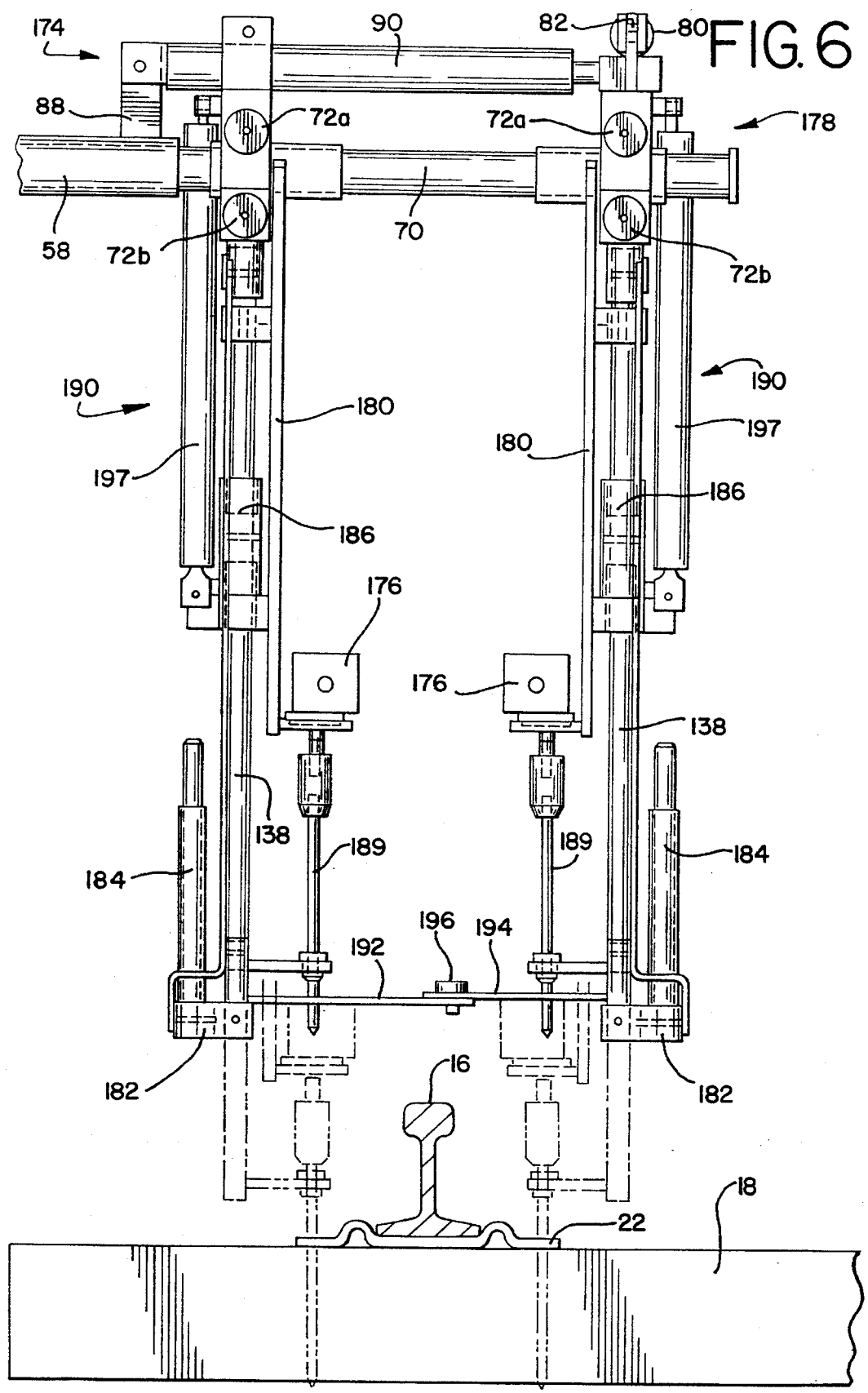
FIG. 6 is an elevational view of the tie borer module of FIG. 5 as seen from the rear of the machine of FIG. 1.

Referring now to FIGS. 5 and 6, another detachable task-oriented module is depicted and is generally designated 174. The module 174 functions as a tie borer attachment, and is designed for boring holes for accommodating lag screws or other fasteners. The module 174 includes at least one and preferably a pair of guns, each having a tie drill 176 equipped with a shared tie borer spotting carriage 178. The spotting carriage 178 is substantially identical to the carriage 66, and accordingly, identical components have been designated with identical reference numerals. An important feature of the carriage 178 is that it also has a pair of main shafts 70 which slidably engage the carriage support tubes 58 in the base unit 12. This engagement forms the major support for the tie borer module 174, as is the case for the spike driver module 62 and the rail fastener applicator module 122.

The most significant difference between the tie borer module 174 and the lag screw applicator module 122 is that the tie borer module has replaced the impact wrench 128 with the drill 176 which, in the preferred embodiment, is hydraulically operated, although electric drills are also contemplated. Similarly, the vertically slidable impact wrench mounting bracket 134 has been replaced by a drill mounting bracket 180.

Basically, the hydraulic cylinder 197 moves the mounting bracket 180 vertically along the carriage shafts 138. A lower bracket 182 replaces the feeder frame 144 and the gripping portion 126, and provides a lower attachment for the vertical carriage shafts 138. To control the vertical travel of the drill 176, an adjustable vertically projecting spacer rod 184 controls the vertical travel of a slide block 186 by providing a stop for a tab 188 (shown hidden in FIG. 5) projecting laterally from a lower end of the slide block 186. The impact wrench extension 150 is replaced with an elongate drill bit 189.

Another structural difference between the tie borer module 174 and the rail fastener applicator module 122 is that, unlike the guns 172, the individual tie drills 176 must be kept rigidly supported relative to the spotting carriage 178. To achieve this support, each of the two drill assemblies or guns, each generally designated 190, is connected to its mate by at least one pair of bars 192, 194 (best seen in FIG. 6), which are fixed to lower ends of the vertical carriage shafts 138, and to each other by a locking pin 196. In certain applications, a suitable threaded tie bar (not shown) similar to the tie bar assembly 86 may also be included to maintain the relative position of the two drill assemblies 190 to each other. Additional structural details of the tie borer module 174 are disclosed in co-pending U.S. Ser. No. 08/103,056 filed Aug. 6, 1993, which has been incorporated by reference.

The control of the tie borer module 174 is similar to the lag screw applicator module 122, with the same valves 166 and 170, which in this case are actuated simultaneously, respectively controlling the descent and ascent of the bracket 180 on the vertical carriage shafts 138 through the action of hydraulic cylinder 197, and the rotation of the bit 189. The drills 176 are vertically movable under joystick control from an elevated or ready position shown in solid in FIG. 6, and a drilling or operational position shown in phantom in FIG. 6. In similar fashion to the modules 62 and 122, hydraulic connections for the module 174 are made at the quick connect plate 102, at which the respective module hydraulic lines 104, which lead from corresponding hydraulic cylinders, are connected to valve lines 106 connected to the bank of corresponding valves 108 mounted on the frame 24. Electrical connection of the module 174 to the base unit 12 is achieved at the control cabinet 110 through the cable 114.

Referring now to FIGS. 7 and 8, another module suitable for use with the present system 10 is generally designated 200, and is referred to as a spike puller module. As may be gleaned from its name, the module 200 is configured for pulling spikes 20 from ties 18. The basic structure of the module 200 is that a pair of spike pulling claws 202 are provided, each claw being disposed on one side of a corresponding rail 16. The claws 202 are each attached through an arm 204 to an articulating mechanism, designated 206. The arms 204 are pivotable about an axis which is parallel to the rail 16.

A claw housing 208 includes a portion which encloses the pivot axis of the arms 204, and is reciprocally vertically slidable upon a pair of vertical posts 210 of a roller frame 212. The roller frame 212 is horizontally reciprocable relative to a mounting bracket 214, which is attached to the base unit 12. The roller frame 212 is provided with a lower, basically rectangular portion 216 which includes the vertical posts 210, and is provided with a pair of rollers 217 designed to ride on the surface of the rail 16 during spike pulling. An upper, generally "A"-shaped portion 218 is secured to the top of the rectangular portion 216 of the roller frame.

At the top of the "A"-shaped frame 218 is located a mounting point 220 for a hydraulic cylinder 222. The cylinder 222 has a vertically reciprocating shaft 224 which passes through an upper beam 226 of the frame 212 and is connected to the mechanism 206 by a clevis 228. Also included on the claw housing 208 are a pair of connecting blocks 230 which are each secured, as by welding, to a corresponding vertical sleeve or tube 232. Each tube 232 circumscribes a corresponding vertical shaft 234 having a slide block 236 at each of its upper and lower ends.

The upper slide block is disposed in an upper track 238, and the lower slide block is disposed in a lower track 240. Both tracks, 238, 240 are parallel to each other, and run parallel to the rails 16. Horizontal reciprocation of the roller frame 212 in the tracks 238, 240 is powered by a hydraulic cylinder 242 (shown fragmentarily) which is connected at one end to a lower end of one of the shafts 234, and at the opposite end to the base unit 12.

The mounting bracket 214 which includes the tracks 238, 240 is secured to the frame 24 of the base unit at a lower end by a pair of hooks 244 which rest on one of the main tubes 42. At an upper end of the bracket are provided mounting openings 246 through which threaded fasteners such as bolts 248 pass into the vertical columns 50 of the frame 24. In this manner, the bracket 214 is rendered immovable relative to the base unit 12.

In FIGS. 7 and 8, the module 200 is depicted in an upper or transport position, wherein the claw housing 208 is secured against vertical movement on the shafts 234 by at least one claw housing locking pin 250, and is also secured against movement relative to the roller frame 212 by at least one roller frame locking pin 252. To move the module 200 to a lowered operational position, the cylinder 222 is slightly extended to take the load off the roller frame locking pin 252 and allow its withdrawal. The cylinder 222 is then retracted, which would normally pull the claw housing upward. However, since the claw housing locking pin 250 and the upper track 240 prevent any vertical movement of the claw housing relative to the base unit 12, the roller frame 212 gradually descends until the rollers 217 contact the rail 16.

With the weight of the roller frame on the rail, a slight retraction of the cylinder 222 will take the load off of the claw housing locking pin 250, allowing its withdrawal from the shaft 234. Subsequent extension of the cylinder 222 will lower the claw housing 208 relative to the roller frame 212, and the sleeves 232 will be lowered relative to the shafts 234. The module 200 is now in the operational position, wherein the arcuate travel of the arms 204 will place the claws 202 within grasping range of spikes 20 disposed in the ties 18. To prepare the module for transport, the above process is reversed.

The arcuate movement of the arms 204 is controlled by a hydraulic arm cylinder 254 under the control of the joystick 31. The arm cylinder is used to properly engage the claws under the heads of the spikes 20, then the cylinder 222 is used for retracting the spikes from the ties. Additional details of the operation and construction of the spike puller module 200 are disclosed in U.S. Pat. No. 4,538,793, which is incorporated by reference.

If the present module 200 is to be utilized with hairpin spikes, a specialized control circuit 255 is provided. The circuit 255 permits operation of a hairpin spike retraction tool (not shown) which mounts on each arm 204 in place of the claws 202. The construction and operation of the hairpin spike tool is disclosed in commonly-assigned U.S. Pat. No. 5,253,844, which is incorporated by reference.

Referring now to FIG. 9, the construction of the tie nipper assembly 56 is shown in greater detail. The assembly 56 is used to securely grasp the tie 18 while certain track maintenance operations are being conducted, such as spike driving. The nippers secure the tie 18 against the rail 16 and the tie plate 22 to prevent unwanted movement of the tie during driving. The assembly 56 includes a pair of nipper hooks 256 having a centrally located main pivot axis 258 pivoting about a nipper mounting 260. A rear lobe 262 of each nipper hook has a pivot pin 264 which connects the hook to one end of a tie bar 266. The opposite end of the tie bar 266 is connected to a pivot pin 268 and to a block 270. A shaft 272 of a hydraulic cylinder 274 is connected to the block 270. As the shaft is extended downwardly, the tie bars pull the hooks 256 away from the tie 18. As the shaft 272 is retracted, the hooks are closed about the tie. Then, the entire assembly is retracted to pull the tie against the tie plate 22 and the rail 16.

Figure 10:
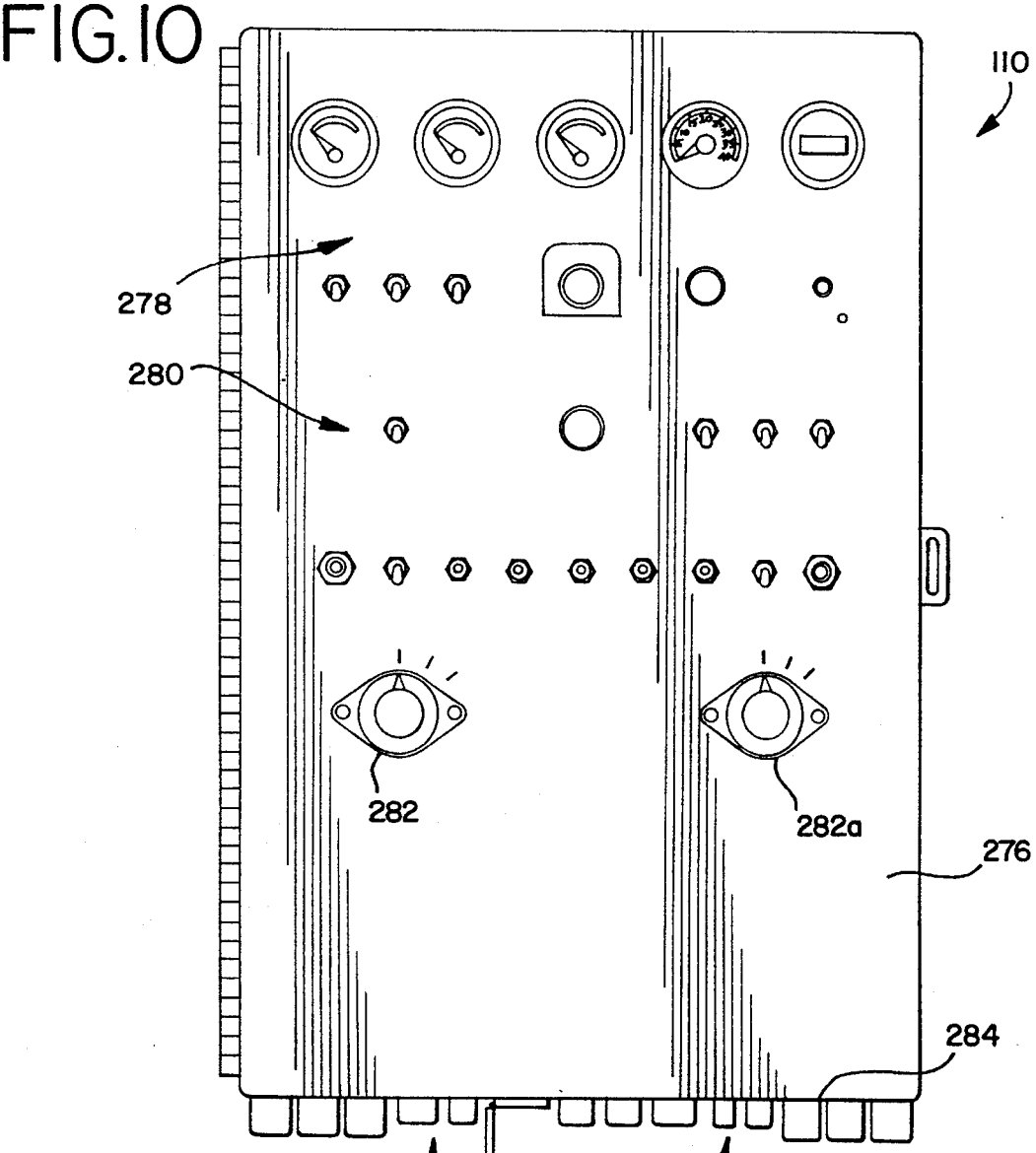
FIG. 10 is a front elevational view of the control panel of the present base unit.

Referring now to FIG. 10, a front elevational view of the electrical control cabinet 110 is shown, depicting a control panel 276. Along a top row of instruments 278 are preferably located gauges such as fuel, voltmeter, air pressure, tachometer and engine hour meter. The specific selection and orientation of gauges may vary with the application. In a central portion 280 of the control panel are preferably disposed switches for operating the operator seat 30, the engine 28, and accessories such as a horn or lights as is well known in the art.

Below the central portion 280 are preferably located module selector switches 282 and 282a, one of which is assigned to operate modules on a corresponding side 34, 36 of the base unit 12. In the preferred embodiment, the switches 282, 282a are of the three-position, three wafer type, and are configured for operating the spike driver, tie borer and spike puller modules 62, 174 and 200 respectively. The operation of the lag screw applicator module 122 is performed at the setting for the spike driver 62.

At a lower surface 284 of the control panel 110 are located the electrical cable connector points 112. It will be noted that there are several points 112, which are preferably multi-pin connector sockets, for accommodating the various modules 62, 122, 174 and 200. Also, a set of connector sockets 112 are supplied for each side 34, 36 of the base unit 12, in that dissimilar modules may be mounted to either side at any given time. The connector sockets 112 connect the cable 114 for any specific module to the appropriate selector switch 282, 282a, as well as the attendant circuitry (not shown), which is well known to skilled designers of such equipment, and principally relates to the control of the hydraulic system. A connector 112 is also provided for the control of the nipper attachment assembly 56. The hydraulic system will be described in further detail in relation to FIGS. 12–14.

Figure 11:
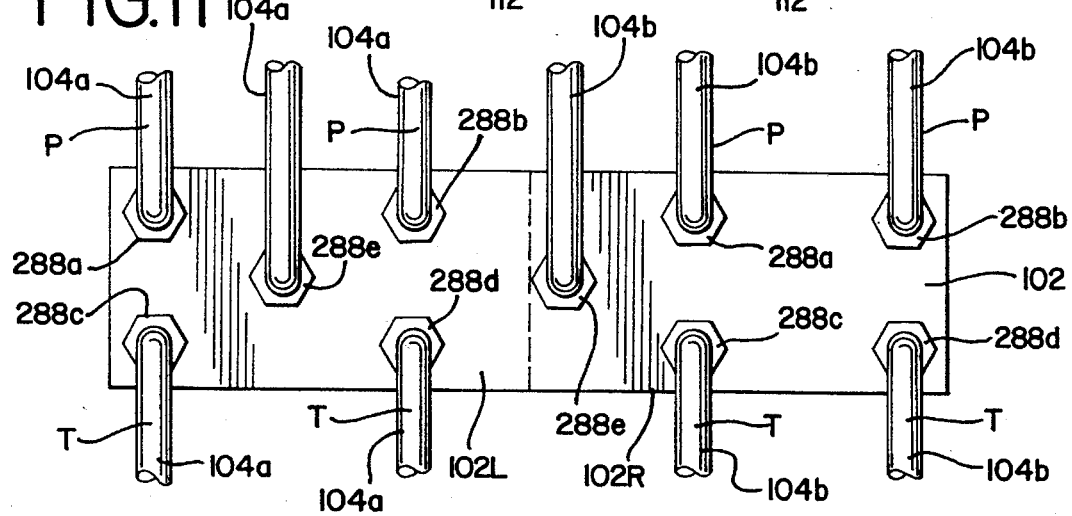
FIG. 11 is a bottom plan view of the hydraulic connector plate of the present base unit.

Referring now to FIG. 11, the hydraulic quick connector plate 102 or manifold plate is shown in greater detail. For the purposes of this discussion, "module" may designate any of the modules described above, or their equivalents, or even additional modules which may be provided for performing other rail maintenance tasks, such as rail anchor removing. It will be appreciated that one such plate 102 is provided for each side 34, 36 of the base unit 12, and each plate controls both of the module guns such as 64, 172 which operate on corresponding sides of each rail 16. In that each module carries with it several hydraulic lines 104, in the preferred embodiment each connection point on the plate 102 is identified, such as by size of fitting, to prevent misconnection of module lines to valve lines.

In FIG. 11, the hydraulic lines 104 have been designated 104a for those lines emanating from a first gun 64, 172, and 104b for those lines originating from a second gun 64, 172 of a particular module. Although only reference numerals 64, 172 have been designated here, it will be appreciated that, with the exception of the spike puller module 200, any module attached to a corresponding side of the base unit will have functional components or "guns" for performing tasks on each side of the corresponding rail 16.

The exchange of modules is facilitated by the provision of conventional quick connect/disconnect fittings 288 for each of the lines 104. To prevent misconnection of lines 104, the plate 102 has been divided into left and right halves, 102L and 102R which correspond to the left and right, or rail-inside and rail-outside guns of the module. Each half 102L, 102R is provided with five fittings 288a–288e. In the preferred embodiment, for each gun, two of the lines 104, designated 'P', are the "pressure" lines, are of smaller diameter than the other two or "tank" lines, 'T' and their corresponding connection points are easily distinguished. Typical sizes for the pressure line 'P' is ⅜ inch, and ½ inch for the tank line 'T'. Each of the two pressure and tank lines are distinguished from each other by providing the connectors in male and female configuration using conventionally available hydraulic hardware. In the preferred embodiment, fittings 288a and 288b are ⅜" male and ⅜" female, respectively, and fittings 288c and 288d are ½" female and male, respectively.

Another mechanism for differentiating the lines 104 and preventing misconnection is the disposition of the fittings 288 on the plate 102. Four of the fittings 288a–d for each gun are preferably disposed in a box-like array, while the fifth 288e, is shown in an offset position. This fitting 288e is employed for connecting the lines leading from the spike/lag screw feeder and gripping assemblies 95, 96 and 124, 126, respectively. In that the modules 62, 122 and 174 all use the same carriage, the lines for the carriage cylinders 80 and 90 of each module are connected separately from the plate 102. Thus, it will be seen that by using size of fitting, male/female configuration and disposition on the plate 102, the chance of misconnection of lines is significantly reduced.

Figure 12:
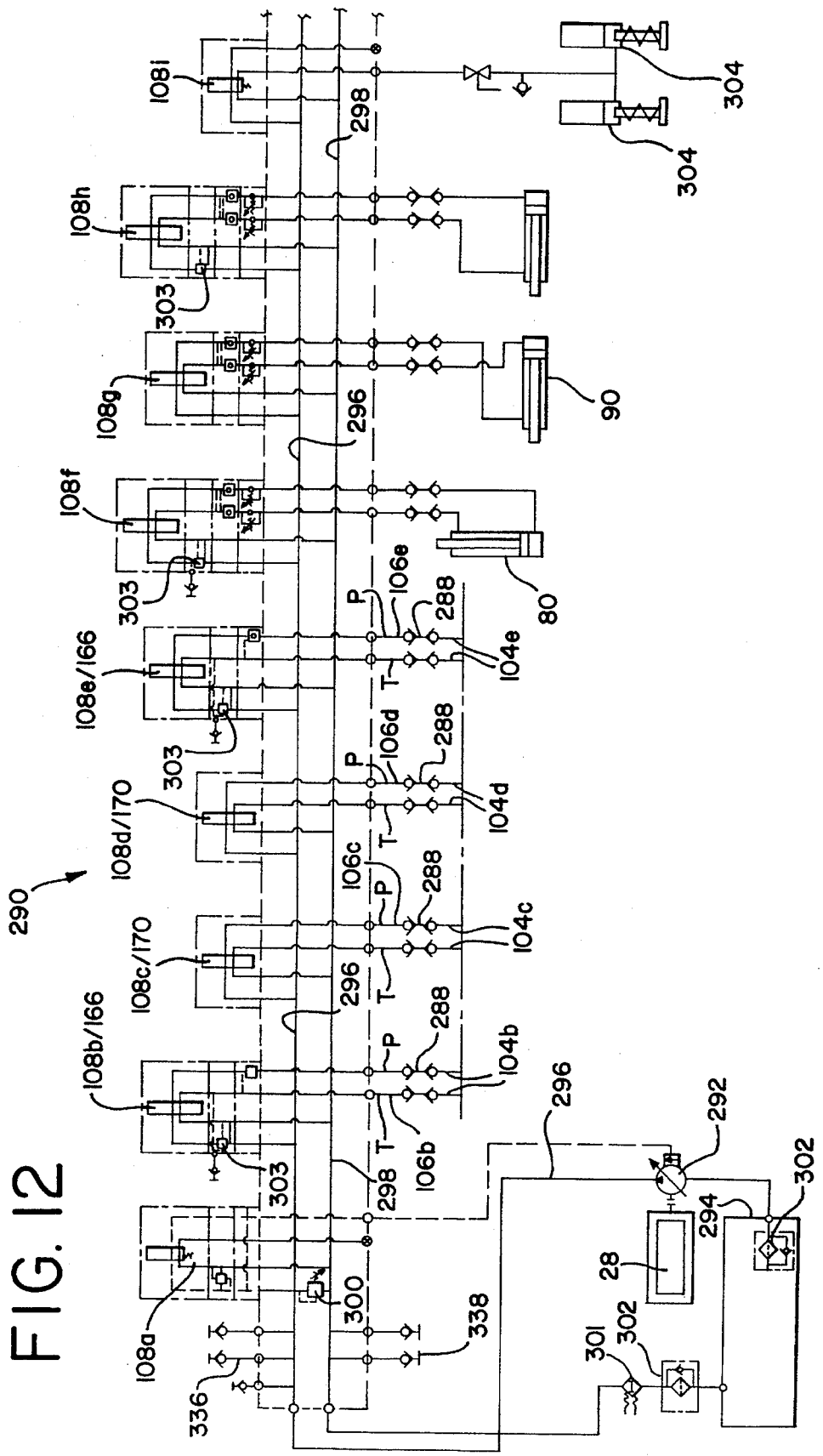
FIG. 12 is a hydraulic schematic of the control circuit for one side of the base unit of FIG. 1.

Referring now to FIGS. 12-15, the hydraulic circuitry for pertinent portions of the present system 10, including the base unit 12 and the various modules, is shown in schematic form. Referring initially to FIG. 12, the base unit circuitry is shown, the principal feature of which is the array of valves 108, designated 108a–i, which are prominently visible on the base unit 12. Actually, the valves 108a–i represent approximately half the actual number of valves, but are depicted here for purposes of clarity as applying to only one side 36, 38 of the base unit 12. Valves 108b–g are duplicated for the opposite side.

Also included in the circuit, generally designated 290, is a pump 292 driven by the engine 28 which draws hydraulic fluid from a tank 294 and pumps it through a pressure line 296 to the valves 108. Valve 108a is a two-position, two-way pump control valve used to regulate pressure to the modules between a high pressure setting employed during traveling of the base unit 12 along the rail, and a low pressure setting employed for module operation. All of the valves 108 are connected to the pressure line 296 and a tank line 298. A relief valve 300 maintains system pressure below 2700 psi. Also included in the circuit 290 are an oil cooler 301 and filters 302.

Proceeding down the array of valves 108, valve 108b, as well as valves 108c–h, are all three-position, four-way valves which are most suitable for controlling the double-acting hydraulic cylinders, as well as hydraulic motors and other devices of the sort employed on most of the modules. The valves 108b–e each are shown with corresponding 'P' and 'T' pairs of lines 106b–e to the quick connect fittings 288 described above in relation to FIG. 11. Valves 108b, e, f and h each have a designated relief valve 303 for setting the pressure to the particular requirements of specific modules.

In the preferred embodiment, the valve 108b controls the up/down cylinder no. 1, which corresponds to the cylinder 146 of one of the guns in the rail fastener module 122, and a similar cylinder is also found in the spike driver module 62, and the tie borer module 174. The no. 2 gun cylinder of the module is controlled by valve 108e. In valves 108b and 108e, the corresponding relief valve 303 is preferably set at 500 psi.

The valve 108c controls either the tie borer drill motor 176 of one of the guns, or a hydraulic percussive spiker hammer used for percussive spiking. The other drill/hammer gun on the module is controlled by the valve 108d.

Control of the spotting carriage 66 is achieved by the valves 108f and 108g, with valve 108f controlling the front-rear carriage movement parallel to the rail through the cylinder 80, and valve 108g controlling the left-right movement transverse to the rail through the cylinder 90. The valve 108h controls the movement of the operator seat 30 and valve 108i controls brake cylinders 304 for the base unit 12. The relief valve 303 for valve 108f is preferably set at 750 psi, while the corresponding component for valve 108h is preferably set at 300 psi. The tie nipper assembly 56 is provided with its own hydraulic circuitry (not shown) which is conventional and well known to skilled practitioners.

Figure 13:
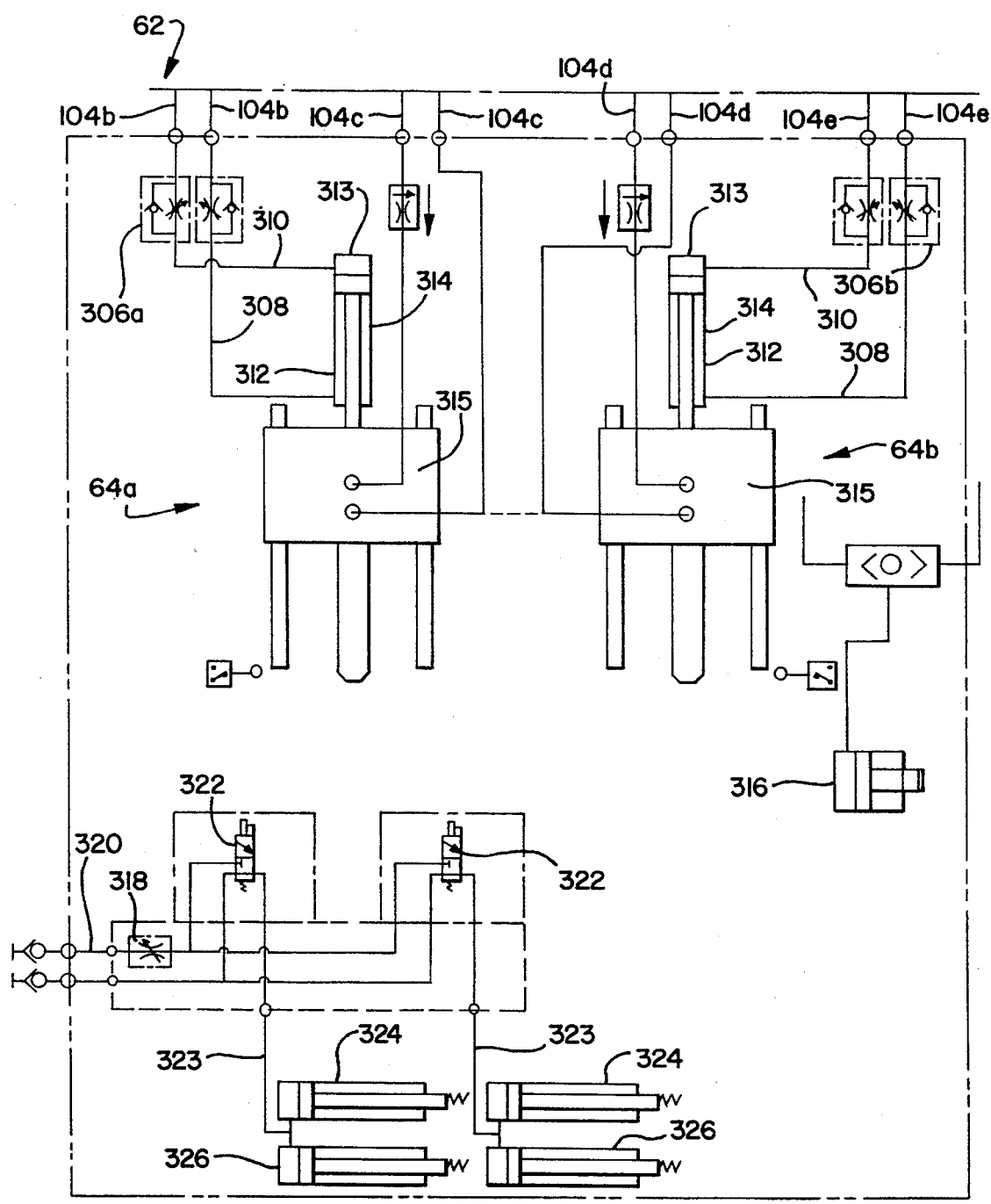
FIG. 13 is a hydraulic schematic of the control circuit for the spike driver and rail fastener applicator modules.

Referring now to FIG. 13, the hydraulic schematic of the modules 62 and 122 is depicted. For simplicity of explanation, the following description will relate to the module 62. It will be understood that for module 122, certain components are replaced, including the impact wrench 128 replacing the ram portion 92. Both guns 64 are depicted, designated 64a and 64b. The lines 104b leading from the plate 102, where they connect to lines 106b (shown in FIG. 12), are connected to flow control valves 306a, 306b respectively. Each flow control valve 306a, 306b is configured for accommodating hydraulic lines 308, 310 from the rod end 312 and the blind end 313 of a driving cylinder 314 which raises and lowers the percussive hammer feature, designated 315. A hydraulic carriage stabilizer 316 is preferably provided to minimize lateral deflection of the lower ends of the guns 62.

Also included in FIG. 13 is the circuitry for the spike/lag screw feeding/gripping portions 95, 96 and 124, 126 respectively. A flow control valve 318 is connected to the pressure line 320, and also to a two-position, three-way spike feed valve 322, which, through line 323 regulates flow into a spike pusher cylinder 324 and a spike index cylinder 326. The pusher cylinder 324 pushes a spike/lag screw received from the tray 95, 124 into the jaws 158 which overcomes the inherent spring bias of the jaws (best seen in FIG. 3) to allow the jaws to open and receive the spike/lag screw pushed by the pusher cylinder 324. The index cylinder 326 allows another spike or lag screw to fall into the push position where it can be engaged by the pusher cylinder 324. A valve 322 and cylinder circuit 324, 326 is provided for each gun of the module.

Referring now to FIG. 14, the hydraulic circuitry for the tie borer module 174 is depicted in schematic form. Hydraulic lines 104c and 104d are connected at the plate 102 to the corresponding lines 104c and 104d from valves 108c and 108d, also referred to as valve 170. The lines 104c and 104d are each connected to one of the hydraulic drill motors 176, 176a provided to each of the guns. Each motor 176, 176a is provided with a flow control valve 326. Also provided to each of the guns of the module 174 is a corresponding up/down cylinder 197 which is connected to a corresponding one of valves 108b, 108e, also known as valve 166, through lines 104b, 104e. Appropriate flow control valves 328 are provided.

Referring now to FIG. 15, the circuitry for the spike puller module 200 is shown in schematic form. The single, relatively large double-acting cylinder 222 requires additional fluid for pulling spikes. To that end, both valves 108b and 108e supply fluid to the cylinder 222. The hydraulic lines 104b and 104e connect to lines 106b and 106e at the plate 102. In addition, the claw arm cylinder 254 is connected the valve 108c through corresponding lines 104c.

For applications where the hairpin spike pulling tool is attached to the claw arm 204, as disclosed in U.S. Pat. No. 5,253,844, a three-way, two position valve 330 is connected via pressure line 332 and tank line 334 to lines 336 and 338 (best seen in FIG. 12). The valve 330 selectively controls the flow of fluid to a pair of single-acting hydraulic cylinders 340, 340a, one cylinder being provided to each hairpin spike pulling tool for controlling the opening of a pair of pincer hooks which grasp the loop-like head of a hairpin spike. Both of the cylinders 340, 340a have a spring-biased return feature 341. The cylinders 340, 340a are activated through a signal generated by a pressure switch 342 connected to the claw arm cylinder 254.

In operation, the present modular railway maintenance system utilizes task-specific modules which are readily mounted to the base unit 12 to perform necessary maintenance operations. The spike driver module 62, the lag screw applicator module 122 and the tie boring module 174 are all mounted to the base unit 12 in a similar manner, using the carriage support tubes 58, the quick-disconnect electrical connector 112 and the hydraulic quick connect plate 102. The spike puller module 200 utilizes a separate carriage and mounting bracket, however even this bracket is readily mounted to the frame 24 using two bolts 248 and a pair of hooks 244 which engage one of the main tubes 42. The basic operational principals of the particular modules have been discussed hereinabove, and are disclosed in greater detail in the corresponding patents which have been incorporated by reference herein.

Thus, a major feature of the present modular railway maintenance system is the ability of readily converting a base unit to one of a variety of railway maintenance operations, including spike driving of either cut spikes or hairpin spikes, spike pulling, tie boring and lag screw applicating. Another feature is the ability of performing one operation on a first side of the base unit, and a second, distinct operation on the second side of the base unit, corresponding to a separate rail.

While a particular embodiment of the modular railway maintenance system of the invention has been shown and described, it will be appreciated by those skilled in the art that changes and modifications may be made thereto without departing from the invention in its broader aspects and as set forth in the following claims.

What is claimed is:

1. A modular railway maintenance system for performing at least one of a plurality of right-of-way maintenance tasks on a railroad track, comprising;

a base unit including a frame having a plurality of wheels for rotatably engaging the railway track, a first side corresponding to a first rail of the railroad track, and a second side corresponding to a second rail of the railroad track, said frame defining two operational zones for accommodating modules therein;

a first task-oriented module connected to said base unit on said first side in a first said operational zone and a second task-oriented module connected to said second side in a second said operational zone, said first module being configured for performing a maintenance task which is distinct from the task performed by said second module, each of said first and second modules including a spotting carriage portion for locating said module relative to said frame and to the corresponding rail in at least one of a transverse and a parallel direction, a task portion attached to, and suspended from said carriage portion and configured for performing a specific railway maintenance operation on a corresponding side of the track, and at least one control line for connecting said first and second modules to said base frame;

carriage support means on said base unit for engaging said carriage portion and supporting said first and second modules on both of said first and second sides regardless of the specific task performed by said task portion; and positioning and operational control means on said base unit for engaging said at least one control line and controlling the operation of said task portion and said carriage portion on each of said first and second modules regardless of the task performed by said task portion.

2. The system as defined in claim 1 wherein at least one of said first and second modules is releasably secured to said base unit.

3. The system as defined in claim 1 wherein said first and second modules are each taken from the group consisting of tie borers, spike pullers, spike drivers and rail fastener applicators.

* * * * *